(12) United States Patent
Paolini, Jr. et al.

(10) Patent No.: US 6,987,603 B2
(45) Date of Patent: Jan. 17, 2006

(54) CONSTRUCTION OF ELECTROPHORETIC DISPLAYS

(75) Inventors: Richard J. Paolini, Jr., Arlington, MA (US); Robert W. Zehner, Arlington, MA (US); Karl R. Amundson, Cambridge, MA (US); Craig A. Herb, Medord, MA (US); Alexi C. Arango, Somerville, MA (US); Andrew L. Loxley, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/707,991

(22) Filed: Jan. 30, 2004

(65) Prior Publication Data

US 2004/0257635 A1    Dec. 23, 2004

Related U.S. Application Data

(60) Provisional application No. 60/319,919, filed on Jan. 31, 2003.

(51) Int. Cl.
G02B 26/00     (2006.01)
G09G 3/34      (2006.01)
G01N 27/453    (2006.01)

(52) U.S. Cl. .................. 359/296; 345/107; 204/600
(58) Field of Classification Search ............... 359/296, 359/240, 243; 345/107; 430/35, 45; 204/478, 204/485, 600; 445/24
See application file for complete search history.

(56) References Cited

U.S. PATENT DOCUMENTS

| | | | |
|---|---|---|---|
| 3,668,106 A | 6/1972 | Ota | 358/308 |
| 3,756,693 A | 9/1973 | Ota | 345/107 |
| 3,767,392 A | 10/1973 | Ota | 430/35 |
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 4,418,346 A | 11/1983 | Batchelder | 345/107 |
| 5,111,331 A | 5/1992 | Rosenberg | 359/296 |
| 5,279,511 A | 1/1994 | DiSanto et al. | 445/24 |

(Continued)

FOREIGN PATENT DOCUMENTS

| | | |
|---|---|---|
| EP | 1 145 072 B1 | 5/2003 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |
| WO | WO 03/107315 | 12/2003 |

OTHER PUBLICATIONS

Amundson, K., et al., "Flexible Active–Matrix Display Constructed Using a Microencapsulated Electrophoretic Material and an Organic–Semiconductor–Based Backplane", SID 01 Digest, 160 (Jun. 2001).

(Continued)

*Primary Examiner*—Georgia Epps
*Assistant Examiner*—William Choi
(74) *Attorney, Agent, or Firm*—David J. Cole (57) ABSTRACT

An electrophoretic display (100) comprises a front light-transmissive substrate (112), a rear substrate (116) spaced from the front substrate (112) so as to leave a cavity, and an electrophoretic medium (102) in the cavity, the electrophoretic medium (102) comprising a liquid external phase (120) and a plurality of capsules (104) suspended in the liquid external phase (120), each of the capsules comprising a capsule wall, a suspending fluid (106) held within the capsule wall and at least one electrically charged particle (108, 110) suspended in the suspending fluid (106).

17 Claims, 3 Drawing Sheets

U.S. PATENT DOCUMENTS

| | | | |
|---|---|---|---|
| 5,317,667 A | 5/1994 | Weber et al. | 365/147 |
| 5,745,094 A | 4/1998 | Gordon, II et al. | 345/107 |
| 5,760,761 A | 6/1998 | Sheridon | 345/107 |
| 5,777,782 A | 7/1998 | Sheridon | 359/296 |
| 5,808,783 A | 9/1998 | Crowley | 359/296 |
| 5,872,552 A | 2/1999 | Gordon, II et al. | 345/107 |
| 5,930,026 A | 7/1999 | Jacobson et al. | 359/296 |
| 5,961,804 A | 10/1999 | Jacobson et al. | 204/606 |
| 6,017,584 A | 1/2000 | Albert et al. | 427/213.3 |
| 6,054,071 A | 4/2000 | Mikkelsen, Jr. | 264/1.36 |
| 6,055,091 A | 4/2000 | Sheridon et al. | 359/296 |
| 6,067,185 A | 5/2000 | Albert et al. | 359/296 |
| 6,097,531 A | 8/2000 | Sheridon | 359/296 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 422/213.3 |
| 6,124,851 A | 9/2000 | Jacobson | 345/206 |
| 6,128,124 A | 10/2000 | Silverman | 359/296 |
| 6,130,773 A | 10/2000 | Jacobson et al. | 359/296 |
| 6,130,774 A | 10/2000 | Albert et al. | 359/296 |
| 6,137,467 A | 10/2000 | Sheridon et al. | 345/107 |
| 6,144,361 A | 11/2000 | Gordon, II et al. | 345/107 |
| 6,147,791 A | 11/2000 | Sheridon | 359/296 |
| 6,172,798 B1 | 1/2001 | Albert et al. | 359/296 |
| 6,177,921 B1 | 1/2001 | Comiskey et al. | 345/107 |
| 6,184,856 B1 | 2/2001 | Gordon, II et al. | 345/107 |
| 6,225,971 B1 | 5/2001 | Gordon, II et al. | 345/107 |
| 6,232,950 B1 | 5/2001 | Albert et al. | 345/107 |
| 6,241,921 B1 | 6/2001 | Jacobson et al. | 264/1.36 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,271,823 B1 | 8/2001 | Gordon, II et al. | 345/107 |
| 6,300,932 B1 | 10/2001 | Albert | 345/107 |
| 6,301,038 B1 | 10/2001 | Fitzmaurice et al. | 359/265 |
| 6,312,304 B1 | 11/2001 | Duthaler et al. | 445/24 |
| 6,312,971 B1 | 11/2001 | Amundson et al. | 436/99 |
| 6,323,989 B1 | 11/2001 | Jacobson et al. | 359/296 |
| 6,327,072 B1 | 12/2001 | Comiskey et al. | 359/296 |
| 6,376,828 B1 | 4/2002 | Comiskey | 359/296 |
| 6,377,387 B1 | 4/2002 | Duthaler et al. | 359/296 |
| 6,392,785 B1 | 5/2002 | Albert et al. | 359/296 |
| 6,392,786 B1 | 5/2002 | Albert | 359/296 |
| 6,413,790 B1 | 7/2002 | Duthaler et al. | 438/21 |
| 6,422,687 B1 | 7/2002 | Jacobson | 347/55 |
| 6,445,374 B2 | 9/2002 | Albert et al. | 345/107 |
| 6,445,489 B1 | 9/2002 | Jacobson et al. | 359/296 |
| 6,459,418 B1 | 10/2002 | Comiskey et al. | 345/107 |
| 6,473,072 B1 | 10/2002 | Comiskey et al. | 345/173 |
| 6,480,182 B2 | 11/2002 | Turner et al. | 345/107 |
| 6,498,114 B1 | 12/2002 | Amundson et al. | 438/780 |
| 6,504,524 B1 | 1/2003 | Gates et al. | 345/107 |
| 6,506,438 B2 | 1/2003 | Duthaler et al. | 427/58 |
| 6,512,354 B2 | 1/2003 | Jacobson et al. | 324/71.1 |
| 6,515,649 B1 | 2/2003 | Albert et al. | 345/107 |
| 6,518,949 B2 | 2/2003 | Drzaic | 345/107 |
| 6,521,489 B2 | 2/2003 | Duthaler et al. | 438/149 |
| 6,531,997 B1 | 3/2003 | Gates et al. | 345/107 |
| 6,535,197 B1 | 3/2003 | Comiskey et al. | 345/107 |
| 6,538,801 B2 | 3/2003 | Jacobson et al. | 359/296 |
| 6,545,291 B1 | 4/2003 | Amundson et al. | 257/40 |
| 6,580,545 B2 | 6/2003 | Morrison et al. | 359/265 |
| 6,639,578 B1 | 10/2003 | Comiskey et al. | 345/107 |
| 6,652,075 B2 | 11/2003 | Jacobson | 347/55 |
| 6,657,772 B2 | 12/2003 | Loxley | 359/296 |
| 6,664,944 B1 | 12/2003 | Albert et al. | 345/107 |
| D485,294 S | 1/2004 | Albert | D18/26 |
| 6,672,921 B1 | 1/2004 | Liang et al. | 445/24 |
| 6,680,725 B1 | 1/2004 | Jacobson | 345/107 |
| 6,683,333 B2 | 1/2004 | Kazlas et al. | 257/197 |
| 6,693,620 B1 | 2/2004 | Herb et al. | 345/107 |
| 6,704,133 B2 | 3/2004 | Gates et al. | 351/296 |
| 6,710,540 B1 | 3/2004 | Albert et al. | 313/498 |
| 6,721,083 B2 | 4/2004 | Jacobson et al. | 359/296 |
| 6,724,519 B1 | 4/2004 | Morrison et al. | 359/296 |
| 6,727,881 B1 | 4/2004 | Albert et al. | 345/107 |
| 6,738,050 B2 | 5/2004 | Comiskey et al. | 345/173 |
| 6,750,473 B2 | 6/2004 | Amundson et al. | 257/40 |
| 6,753,999 B2 | 6/2004 | Zehner et al. | 359/296 |
| 6,788,449 B2 | 9/2004 | Lang et al. | 359/296 |
| 6,816,147 B2 | 11/2004 | Albert | 345/107 |
| 6,819,471 B2 | 11/2004 | Amundson et al. | 359/296 |
| 6,822,782 B2 | 11/2004 | Pratt et al. | 359/296 |
| 6,825,068 B2 | 11/2004 | Denis et al. | 438/149 |
| 6,825,829 B1 | 11/2004 | Albert et al. | 345/107 |
| 6,825,970 B2 | 11/2004 | Goenaga et al. | 359/296 |
| 6,831,769 B2 | 12/2004 | Holman et al. | 359/296 |
| 6,839,158 B2 | 1/2005 | Albert et al. | 359/296 |
| 6,842,167 B2 | 1/2005 | Albert et al. | 345/107 |
| 6,842,279 B2 | 1/2005 | Amundson | 359/296 |
| 6,842,657 B1 | 1/2005 | Drzaic et al. | 700/120 |
| 6,864,875 B2 | 3/2005 | Drzalc et al. | 345/107 |
| 6,865,010 B2 | 3/2005 | Duthaler et al. | 359/296 |
| 6,866,760 B2 | 3/2005 | Paolini Jr. et al. | 204/478 |
| 6,870,661 B2 | 3/2005 | Pullen et al. | 359/296 |
| 2002/0060321 A1 | 5/2002 | Kazlas et al. | 257/66 |
| 2002/0063661 A1 | 5/2002 | Comiskey et al. | 345/55 |
| 2002/0090980 A1 | 7/2002 | Wilcox et al. | 455/566 |
| 2002/0113770 A1 | 8/2002 | Jacobson et al. | 345/107 |
| 2002/0130832 A1 | 9/2002 | Baucom et al. | 345/107 |
| 2002/0180687 A1 | 12/2002 | Webber | 345/107 |
| 2003/0011560 A1 | 1/2003 | Albert et al. | 345/107 |
| 2003/0020844 A1 | 1/2003 | Albert et al. | 349/33 |
| 2003/0102858 A1 | 6/2003 | Jacobson et al. | 324/158.1 |
| 2003/0132908 A1 | 7/2003 | Herb et al. | 345/107 |
| 2003/0137521 A1 | 7/2003 | Zehner et al. | 345/589 |
| 2003/0151702 A1 | 8/2003 | Morrison et al. | 349/25 |
| 2003/0214695 A1 | 11/2003 | Abramson et al. | 359/265 |
| 2003/0218595 A1 * | 11/2003 | Eldon et al. | 345/107 |
| 2003/0222315 A1 | 12/2003 | Amundson et al. | 257/368 |
| 2004/0012839 A1 | 1/2004 | Cao et al. | 359/296 |
| 2004/0014265 A1 | 1/2004 | Kazlas et al. | 438/200 |
| 2004/0027327 A1 | 2/2004 | LeCain et al. | 345/107 |
| 2004/0075634 A1 | 4/2004 | Gates | 345/99 |
| 2004/0094422 A1 | 5/2004 | Pullen et al. | 204/600 |
| 2004/0105036 A1 | 6/2004 | Danner et al. | 348/748 |
| 2004/0112750 A1 | 6/2004 | Jacobson et al. | 204/601 |
| 2004/0119681 A1 | 6/2004 | Albert et al. | 345/107 |
| 2004/0136048 A1 | 7/2004 | Arango et al. | 359/296 |
| 2004/0155857 A1 | 8/2004 | Duthaler et al. | 345/107 |
| 2004/0480476 | 9/2004 | Kazlas et al. | 438/146 |
| 2004/0196215 A1 | 10/2004 | Duthaler et al. | 345/30 |
| 2004/0233509 A1 | 11/2004 | Zhang et al. | 359/296 |
| 2005/0035941 A1 | 2/2005 | Albert et al. | 345/107 |

OTHER PUBLICATIONS

Bach, U., et al., "Nanomaterials–Based Electrochromics for Paper–Quality Displays", Adv. Mater., 14(11), 845 (2002).

Chen, Y., et al., "A Conformable Electronic Ink Display using a Foil–Based a–Si TFT Array", SID 01 Digest, 157 (Jun. 2001).

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active–Matrix Color Displays Using Electrophoretic Ink and Color Filters", SID 02 Digest, 1374 (2002).

Jacobson, J., et al., "The last book", IBM Systems J., 36, 457 (1997).

Jo, G–R, et al., "Toner Display Based on Particle Movements", Chem. Mater, 14, 664 (2002).

Kazlas, P., et al., "12.1"SVGA Microencapsulated Electrophoretic Active Matrix Display for Information Appliances, SID 01 Digest, 152 (Jun. 2001).

Kitamura, T., et al., "Electrical toner movement for electronic paper–like display", Asia Display/IDW '01, P. 1517, Paper HCS1–1 (2001).

O'Regan, B. et al., "A Low Cost, High–efficiency Solar Cell Based on Dye–sensitized colloidal $TiO_2$ Films", Nature, vol. 353, Oct. 24, 1991, 773–740.

Pitt, M.G., et al., "Power Consumption of Microencapsulated Electrophoretic Displays for Smart Handheld Applications", SID 02 Digest, 1378 (2002).

Webber, R., "Image Stability in Active–Matrix Microencapsulated Electrophoretic Displays", SID 02 Digest 126 (2002).

Wood, D., "An Electrochromic Renaissance?" Information Display, 18(3), 24 (Mar. 2002).

* cited by examiner

CONSTRUCTION OF ELECTROPHORETIC DISPLAYS

CROSS REFERENCE TO RELATED APPLICATIONS

This application claims benefit of copending application Ser. No. 60/319,919, filed Jan. 31, 2003. The entire contents of this application, and of all United States Patents, published applications and copending applications mentioned below, are herein incorporated by reference.

BACKGROUND OF INVENTION

This invention relates to construction of electrophoretic displays. More specifically, this invention relates to (a) encapsulated electrophoretic displays in which a liquid phase is present outside the capsules; (b) an electrophoretic display which serves as an optical switch; and (c) novel arrangements for addressing electrophoretic displays. Some aspects of the invention may be useful in non-electrophoretic electro-optic displays.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Published Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. D485,294; 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; and 6,683,333; and U.S. patent applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0076573; 2003/0096113; 2003/0102858; 2003/0132908; 2003/0137521; 2003/0137717; 2003/0151702; 2003/0189749; 2003/0214695; 2003/0214697 and 2003/0222315; and International Applications Publication Nos. WO 99/67678; WO 00/05704; WO 00/38000; WO 00/38001; WO 00/36560; WO 00/67110; WO 00/67327; WO 01/07961; WO 01/08241; WO 03/092077; WO 03/104884; and WO 03/107315.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode) so that the particles are hidden by the suspending medium.

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Also, many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; inkjet printing processes; and other similar techniques.) Thus, the resulting display can be flexible. Further, because the display medium can be printed (using a variety of methods), the display itself can be made inexpensively.

One major reason why encapsulated electrophoretic displays can be produced inexpensively by printing processes is that the electrophoretic medium itself has substantial mechanical strength and cohesion; typically, in prior art encapsulated electrophoretic displays, the individual capsules are bound together by a polymeric binder to increase the cohesion of the layer. Thus, not only can the display medium itself be printed, but as described in U.S. Pat. No. 6,177,921, an electrode may be formed by printing a conductive material directly on to the electrophoretic medium; alternatively, an electrode preformed on a substrate can be laminated on to the electrophoretic medium, which is able to withstand the heat and pressure required for such lamination without damage. In such printed or laminated structures, the mechanical strength and cohesion of the electrophoretic medium maintain the requisite spacing between the electrodes disposed on either side of the medium without any need for mechanical spacers or similar devices to control this spacing. Accordingly, if the electrodes (and any substrates attached thereto) are flexible, the encapsulated electrophoretic display can be curved or rolled without affecting the display qualities of the device; see, for example, Drzaic et al., A Printed and Rollable Bistable Electronic Display SID (Society for Information Display) 98 Digest, page 1131 (1998), which illustrates a flexible encapsulated electrophoretic display being rolled around a pencil without damage.

Although provision of a solid polymeric binder around the capsules in such a display is effective in forming the capsules into a layer with substantial mechanical cohesion, the presence of such a polymeric binder in the final display does give rise to certain problems, especially when the display is to be used for an extended period of perhaps several years. Since the polymeric binder has to be present between the electrodes of the display, any changes in the properties of the binder due to environmental changes affect the electrical characteristics of the display, and the electrical properties of many polymeric binders can change by more than an order of magnitude over the operating temperature range of many electrophoretic displays. Similarly, many polymeric binders are sensitive to humidity and their electrical properties undergo substantial changes within the humidity range over which electrophoretic displays may be required to operate.

A further problem with electrophoretic displays using polymeric binders is that such displays are thermodynamically only metastable. Typically, such displays will comprise electrically charged electrophoretic particles dispersed in a hydrocarbon based suspending fluid, which is itself encapsulated within a capsule wall formed from a hydrophilic material. The hydrophilic capsule wall is itself surrounded by the polymeric binder. It will readily be apparent to those skilled in physical chemistry and thermodynamics that in such a complex system there is substantial potential of migration of species between the various phases as the system tends towards thermodynamic equilibrium. For example, many polymeric binders have a substantial capacity to absorb hydrocarbon solvents, so there is a tendency for such solvents to migrate from within the capsules into the polymeric binder, with resultant changes in the electrical properties of the binder. Perhaps more importantly, many binders contain relatively small molecules, such as residues of curing agents and additives used to improve the storage stability of binders, and these small molecules can migrate from the binder into the suspending fluid within the capsules. Although the amounts of such small molecules migrating into the suspending fluid are small, they can potentially have substantial effects upon the electrophoretic properties of the particles in the suspending fluid; the electrophoretic properties of the particles depend upon maintenance of relatively small charges on the particles, and even minute amounts of some small molecules, and especially ionic species, can have significant effects on the charges of the particles.

It has now been realized that the problems associated with the use of polymeric binders in electrophoretic displays can be reduced or eliminated by replacing the polymeric binder with a liquid, preferably a liquid having a composition similar to that of the suspending fluid of the display, and in one aspect this invention relates to electrophoretic media and displays using such liquid "binders".

This invention also relates to an optical switch based upon electrophoretic or dielectrophoretic motion of particles.

This invention also relates to novel electrode arrangements for use in electrophoretic displays.

SUMMARY OF INVENTION

Accordingly, in one aspect this invention provides an electrophoretic display comprising:

a light-transmissive front substrate;

a rear substrate spaced from the front substrate so as to leave at least one sealed cavity therebetween; and an electrophoretic medium disposed in the at least one sealed cavity, the electrophoretic medium comprising a liquid and a plurality of capsules suspended in the liquid, each of the capsules comprising a capsule wall, a suspending fluid held within the capsule wall and at least one electrically charged particle suspended in the suspending fluid so as to be capable of moving therethrough on application of an electric field to the electrophoretic medium.

The term "light-transmissive" is used herein to mean that the substrate or other layer thus designated transmits sufficient light to enable an observer, looking through that substrate or layer, to observe the change in electro-optic states of the electrophoretic medium, which will be normally be viewed through the substrate or other light-transmissive layer. For obvious reasons, it is desirable that the light-transmissive substrate be as transparent as possible, and typically this substrate will be formed of glass or a transparent polymer.

Hereinafter, the liquid in which the capsules are suspended may be referred to as the "liquid external phase" in order to distinguish it from the liquid which is typically present as the suspending fluid within the capsules.

In such an electrophoretic display, at least one of the front and rear substrates will typically be provided with an electrode arranged to apply an electric field to the electrophoretic medium. The electrophoretic displays may make use of the conventional electrode arrangement in which the front substrate is provided with a single electrode extending across the display, and the rear electrode is provided with a plurality of discrete electrodes.

In this electrophoretic display, the liquid external phase may have substantially the same composition as the suspending fluid; for example, the liquid external phase and the suspending fluid may both comprise a hydrocarbon solvent, or a mixture of a hydrocarbon solvent and a halocarbon. For reasons explained below, it is generally desirable that the liquid external phase have a greater viscosity than the suspending fluid, and that the liquid external phase be substantially iso-osmotic with the suspending fluid.

In contrast to the liquid polymerizable binders used at an intermediate stage in the manufacture of the encapsulated electrophoretic displays described in the aforementioned E Ink and MIT patents and applications, the liquid external phases used in the electrophoretic displays of the present invention are typically intended to remain liquid indefinitely, and hence are desirably kept essentially free from polymerizable species.

The electrophoretic display of the present invention may be of any of the single particle or dual particle types previously described, although dual particle displays are generally preferred. Thus, in the present electrophoretic display, each of the capsules may comprise at least one first type of electrically charged particle suspended in the suspending fluid and at least one second type of electrically charged particle suspended in the suspending fluid, the second type of particle having at least one optical characteristic differing from that of the first type of particle, the second type of particle also having an electrophoretic mobility differing from that of the first type of particle. The first and second types of particles may bear charges of opposite polarities.

The present invention also provides an electrophoretic medium comprising a liquid ("liquid external phase") and a plurality of capsules suspended in the liquid, each of the capsules comprising a capsule wall, a suspending fluid held within the capsule wall and at least one electrically charged particle suspended in the suspending fluid so as to be capable of moving therethrough on application of an electric field to the electrophoretic medium, the liquid being essentially free from polymerizable species.

For reasons already discussed, in such an electrophoretic medium the liquid external phase may have substantially the same composition as the suspending fluid, may have a greater viscosity than the suspending fluid, and may be substantially iso-osmotic with the suspending fluid.

The present invention also provides a process for forming an electrophoretic display as previously described. This process comprises:

providing a front light-transmissive substrate and a rear substrate spaced from the front substrate so as to leave at least one cavity therebetween, at least one of the front and rear substrates having walls defining an aperture connecting the at least one cavity to the exterior surface of at least one of the front and rear substrates;

providing an electrophoretic medium comprising a liquid and a plurality of capsules suspended in the liquid, each of the capsules comprising a capsule wall, a suspending fluid held within the capsule wall and at least one electrically charged particle suspended in the suspending fluid so as to be capable of moving therethrough on application of an electric field to the electrophoretic medium; and introducing the electrophoretic medium via the aperture into the at least one cavity.

In this process, after the electrophoretic medium has been introduced into the at least one cavity, the aperture may be sealed. In one preferred form of the process, prior to the introduction of the electrophoretic medium, the at least one cavity is substantially evacuated, and the introduction of the electrophoretic medium into the at least one cavity is effected by contacting the aperture with a quantity of the electrophoretic medium under a pressure greater than that in the substantially evacuated at least one cavity.

In another aspect, this invention provides an optical switch comprising:

a cladding;

a core having an external surface, a first portion of the external surface being covered by the cladding and a second portion of the external surface not being covered by the cladding; and an electrophoretic medium in contact with the second portion of the external surface, the electrophoretic medium comprising a suspending fluid and a plurality of electrically charged particles suspended in the suspending fluid and capable of moving therethrough on application of an electric field to the electrophoretic medium, the particles having a refractive index differing from that of the suspending fluid.

In this optical switch, the core may have substantially the form of a polygonal prism, with the second portion of the external surface comprising one of the flat faces of the polygonal prism. The optical switch may further comprise means for applying an electric field to the electrophoretic medium, the electric field means being arranged to move the particles between a first position, in which the particles lie adjacent the second portion of the external surface of the core, and a second position, in which the particles are spaced from the second portion of the external surface, the refractive indices of the particles and the suspending fluid being arranged so that in one of the first and second positions light passing along the core passes into the electrophoretic medium and in the other of the first and second positions light passing along the core remains within the core. Alternatively, the optical switch may further comprising means for applying an electric field to the electrophoretic medium, the electric field means being arranged to move the particles between a first position, in which the particles lied adjacent the second portion of the external surface of the core, and a second position, in which the particles are spaced from the second portion of the external surface, the refractive indices of the particles and the suspending fluid being arranged so that in both the first and second positions light passing along the core remains within the core, but that transition from the first to the second position causes a phase shift in the light.

This invention also provides an optical switch comprising:

a waveguide having walls defining a cavity therein;

an electrophoretic medium disposed within the cavity, the electrophoretic medium comprising a suspending fluid and a plurality of electrically charged particles suspended in the suspending fluid and capable of moving therethrough on application of an electric field to the electrophoretic medium, the particles having a dielectric constant differing from that of the suspending fluid; and at least one electrode disposed adjacent the cavity and arranged to apply an electric field to the electrophoretic medium, thereby moving the particles between a first position, in which the particles obstruct transmission of light through the cavity, and a second position, in which the particles permit transmission of light through the cavity.

Finally, this invention provides an electrophoretic display comprising:

a light-transmissive front substrate;

a rear substrate spaced from the front substrate so as to leave a cavity therebetween, the cavity having a front wall adjacent the front substrate, a rear wall adjacent the rear substrate and at least one side wall extending from the front wall to the rear wall;

an electrophoretic medium disposed within the cavity, the electrophoretic medium comprising a suspending fluid and a plurality of electrically charged particles suspended in the suspending fluid and capable of moving therethrough on application of an electric field to the electrophoretic medium;

at least one electrode disposed on the at least one side wall of the cavity; and means for applying a voltage to the at least one electrode and thereby moving the particles between a first position, in which the particles are dispersed through the cavity, thereby preventing light from passing through the cavity, and a second position, in which the particles lie adjacent the at least one electrode, thereby permitting light to pass through the cavity.

DETAILED DESCRIPTION

As already indicated, the present invention has three principal aspects, namely electrophoretic displays using liquid external phases, optical switches using electrophoretic media, and electrophoretic displays having electrodes disposed on side walls extending between the front and rear substrates of the display. These three principal aspects of the present invention will now be discussed separately, although it should be understood that a single apparatus may make use of more than one of these principal aspects; for example, optical switches according to the second principal aspect of the invention may make use of electrophoretic displays having side wall electrodes in accordance with the third principal aspect.

Section A: Electrophoretic Displays Using Liquid External Phase

As already indicated, in one principal aspect this invention provides an encapsulated electrophoretic medium comprising a plurality of capsules, each of the capsules comprising a capsule wall, a suspending fluid retained within the capsule wall and a plurality of electrophoretic particles suspended in the suspending fluid and capable of moving therethrough on application of an electric field to the medium. The medium also comprises a liquid external phase (or "binder") surrounding the capsules.

In a preferred form of this medium, the liquid external phase has substantially the same composition as the suspending fluid within the capsules. Thus, if, as will typically be the case, the suspending fluid is a hydrocarbon, alone or in combination with a halocarbon, the external phase may also be a hydrocarbon, alone or in combination with a halocarbon. Additives such as surfactants and charge control agents present in the suspending fluid may also be included in the external phase to prevent any tendency for such additives to migrate from the suspending fluid into the external phase.

However, although the liquid external phase preferably has substantially the same composition as the suspending fluid, it will usually be desirable for the external phase to have a higher viscosity than the suspending fluid. It has been found empirically that if a slurry of capsules in a liquid is pumped or otherwise forced into a narrow cavity, as for example when such a slurry is being slot coated or die coated to produce an electrophoretic medium of the present invention, the capsules tend to separate from the external phase if the external phase does not have the correct Theological properties. Appropriate viscosity modifiers for use in the external phase are described for example in copending application Ser. No. 09/564,125, filed May 3, 2000 in the name of Craig Herb et al. It should be noted that, since it generally desirable that the liquid external phase be substantially iso-osmotic with the suspending fluid (to prevent migration of liquids into or out of the capsules, since such migration may have undesirable effects upon the composition of the suspending fluid), if a viscosity modifier is included in the external phase, it may be necessary to "balance" the compositions of the suspending fluid and the external phase to ensure they remain substantially iso-osmotic.

As described in the aforementioned E Ink and MIT patents and published applications, the basic process for forming the prior art encapsulated electrophoretic media is as follows. An internal phase is formed comprising the hydrocarbon-based suspending fluid and the electrophoretic particles, together with any additives, such as surfactants and charge control agents, deemed desirable. This internal phase is dispersed as droplets in an aqueous medium and encapsulated in a hydrophilic material. The resultant capsules are separated from the aqueous medium and the fraction of capsules within the desired size range is separated and excess water removed therefrom. The capsules are mixed with a polymeric binder to form a slurry, which is then coated on to a substrate and the binder dried and cured to form an electrophoretic medium.

The liquid external phase electrophoretic medium of the present invention can be manufactured by a simple modification of this prior art procedure. The preparation of the internal phase, the encapsulation and the fractionation of the capsules can all be conducted in the same way as before. Excess water is again removed, although it may be desirable to effect more thorough drying of the capsules at this stage since there is no later drying/curing stage at which further removal of water can be effected. Thorough drying of the capsules may be effected in an oven or by washing the capsules with a water-miscible, volatile solvent. The dried capsules are then mixed with the liquid external phase. Although the resultant slurry of capsules in external phase could be coated on one substrate and covered with a second substrate in the same way as the prior art process using a polymeric binder as the external phase, such a process is likely to lead to the introduction of undesirable air bubbles into the display. Accordingly, in general it is preferred that the slurry of capsules in external phase be introduced into a preformed support/electrode structure (comprising at least the front and rear substrates of the final display) similar to those used to liquid crystal displays (except of course that electrophoretic displays do not require the presence of alignment or "rubbing" layers). The support/electrode structure comprises two parallel substrates or plates, typically bearing electrodes on their facing surfaces, at least one of the plates and its associated electrode being light-transmissive and preferably substantially transparent, and the plates being sealed to each other around their peripheries, except for a small aperture or gap. Typically, spacers, either in the form of discrete particles or ridges or other projections on one or both of the plates, are provided to keep the plates a constant distance apart over the whole area of the display, although it may be possible to omit such spacers in small displays. The support/electrode structure is first substantially evacuated by being placed under vacuum, and is then placed with the gap in the peripheral seal immersed in a bath of the capsules/external phase slurry, so that the slurry is drawn into and fills the space between the plates. The gap is then sealed. It will be apparent to those skilled in the manufacture of liquid crystal displays that this process closely resembles that commonly used to fill such displays, and hence that apparatus developed for use in filling liquid crystal displays may be useful in manufacturing the displays of the present invention.

The aforementioned E Ink and MIT patents and applications note that, in the prior art displays using curable binders, it is important to control the ratio of binder to capsules in order to optimize the electro-optic properties of the final display; too large a proportion of binder may leave areas of the display occupied only by the binder, and since such areas cannot change optical state, they reduce the contrast ratio of the display. On the other hand, too low a proportion of binder may reduce the mechanical integrity of the electrophoretic layer. The ideal form of electrophoretic layer appears to be a substantially close-packed single layer of capsules. Somewhat similar considerations apply to the electrophoretic media and displays of the present invention. Too large a proportion of external liquid phase may leave areas unoccupied by capsules and hence reduce the contrast ratio of the display. Too small a proportion of external liquid phase may yield an electrophoretic medium which can only with difficulty be introduced between the front and rear substrates. The optimum ratio of capsules to external liquid phase for any specific electrophoretic display of the present invention is best determined empirically, although by way of general guidance a starting point of 60:40 v/v capsules:external liquid phase may be appropriate.

There is another parameter of importance in the electrophoretic displays of the present invention which has no counterpart in electrophoretic media using solid binders, namely the ratio of average capsule diameter to the spacing between the front and rear substrates. Obviously, the capsules should not be too large or it will be difficult, if not impossible, to introduce them between the substrates. On the other hand, use of capsules which are too small will lead to the formation of multiple layers of capsules between the substrates instead of the desired close-packed single layer. The choice of capsule diameter is complicated by the variable deformability of electrophoretic capsules, since such deformability means that the capsules tend to form ellipsoids and the effective diameter of the capsules entering between the substrates is less than the diameter typically measured on spherical capsules. Again, the optimum ratio of capsule diameter to substrate spacing is best determined empirically, but by way of general guidance a capsule diameter within +/−25 per cent of the substrate spacing is recommended as a starting point, with the optimum capsule diameter increasing with capsule deformability.

As already mentioned, unlike the liquid but curable binders used in the processes for forming electrophoretic displays described in some of the aforementioned E Ink and MIT patents and applications, the liquid external phases used in the electrophoretic displays of the present invention are typically intended to remain liquid indefinitely, throughout the working life of the display, and hence typically will be free from the polymerizable or curable species present in the prior art curable binders. However, we do not absolutely exclude the presence of such polymerizable or curable species in the present displays, since in certain applications it may be convenient to have such species present so that, after the display has been filled with the liquid electrophoretic medium and sealed, the liquid external phase can be converted to either a solid or a high viscosity liquid or gel by, for example, exposing the completed display to radiation or heat effective to polymerize or cure a species present in the liquid external phase. Such solidification, gelling or increase in viscosity of the liquid external phase may be useful in, for example, improving the mechanical robustness of the display or preventing any tendency for capsules to move within the display, for example when the display is held for a long period in a vertical orientation.

Figure 1:
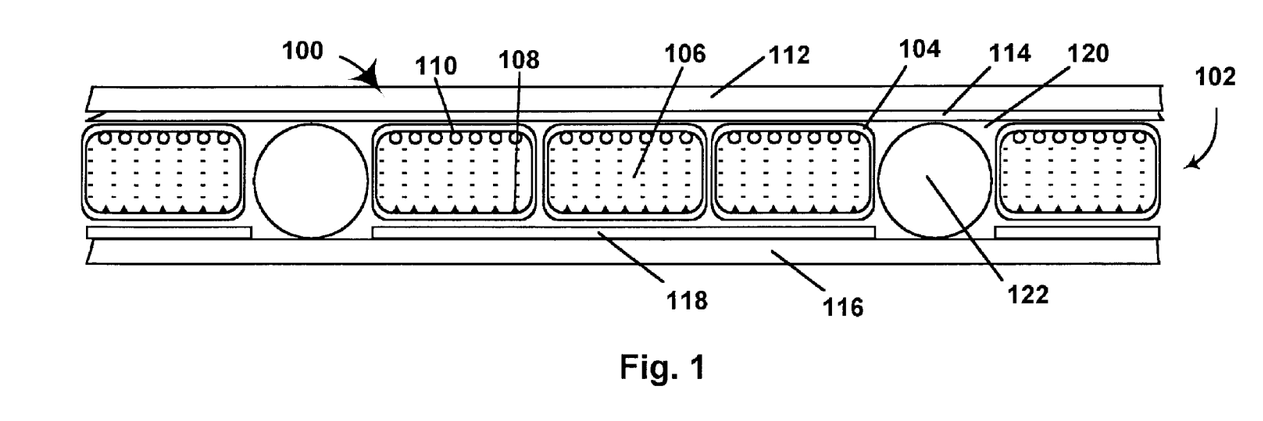
FIG. 1 of the accompanying drawings is a schematic section through an electrophoretic display of the present invention having a liquid external phase.

The preferred electrophoretic display (generally designed 100) of the present invention shown in FIG. 1 comprises an encapsulated electrophoretic medium (generally designated 102) comprising a plurality of capsules 104, each of which contains a suspending liquid 106 and dispersed therein a plurality of a first type of particle 108, which for purposes of illustration will be assumed to be black, and a plurality of a second type of particle 110, which for purposes of illustration will be assumed to be white. The particles 108 are electrophoretically mobile and may be formed of carbon black, while the particles 110 are also electrophoretically mobile and may be formed of titania. In the following description, it will be assumed that the particles 108 are positively charged, and the particles 110 negatively charged. (The triangular shape of the particles 108, and the circular shapes of the particles 110, are used purely to way of illustration to enable the two types of particles to be distinguished easily, and in no way correspond to the physical forms of the actual particles, which are typically substantially spherical.)

The display 100 further comprises a front substrate in the form of a transparent glass plate 112, which forms a viewing surface through which an observer views the display. The plate 112 bears on its inward surface (the lower surface as illustrated in FIG. 1) a common front electrode 114, which extends across the entire area of the display 100. The display 100 also comprises a rear substrate in the form of a glass plate 116, which bears on its inward surface (the upper surface as illustrated in FIG. 1) a plurality of discrete rear electrodes 118, each of which defines one pixel of the display 100. The glass plates 112 and 116 are spaced apart so as to define a cavity therebetween. For ease of illustration and comprehension, FIG. 1 shows only three capsules 104 in the pixel defined by a single rear electrode 118, although in practice a large number (20 or more) capsules are normally used for each pixel. The voltage applied to each of the rear electrodes 118 can be independently controlled using an active matrix drive scheme of the type which will be familiar to those skilled in the technology of liquid crystal displays.

The capsules 102 are surrounded by a liquid external phase 120, which has substantially the same composition as the suspending liquid 106 within the capsules 102. The spacing between the plates 112 and 116 is maintained constant by spacers 122, which are randomly distributed throughout the display 100. Although not shown in FIG. 1, the plates 112 and 116 are sealed to each other around their peripheries to prevent the liquid external phase 120 flowing out of the display 100.

FIG. 1 shows the display 100 with the front electrode 114 positively charged relative to the rear electrode 118 of the central illustrated pixel. The positively charged particles 108 are held electrostatically adjacent the rear electrode 118, while the negatively charged particles 110 are held electrostatically against the front electrode 114. Accordingly, an observer viewing the display 100 through the front plate 112 sees a white pixel, since the white particles 110 are visible and hide the black particles 108.

If in the display 100 the front electrode 114 is made negatively charged relative to the rear electrode 118 of the central illustrated pixel, the positively charged particles 108 are now electrostatically attracted to the negative front electrode 114, while the negatively charged particles 110 are electrostatically attracted to the positive rear electrode 118. Accordingly, the particles 108 move adjacent the front electrode 114, and the pixel displays the black color of the particles 108, which hide the white particles 110.

From the foregoing, it will be seen that this aspect of the present invention provides an electrophoretic medium and display which can use a reduced number of materials, and which reduces or eliminates problems associated with the use of solid polymeric binders. Preferred processes for manufacturing displays of the present invention are similar to those used for prior art liquid crystal displays, which allows existing plant to be utilized in manufacturing the present displays.

Section B: Optical Switches Based Upon Electrophoretic or Dielectrophoretic Motion of Particles As already mentioned, in another principal aspect this invention provides an optical switch based upon electrophoretic or dielectrophoretic motion of particles.

The ability to switch optical signals at telecommunications wavelengths is a very important process for network routing and provisioning. Thus, there is an ongoing search for methods and apparatus to accomplish this switching in a low-cost, reliable, low-power, robust and easy to manufacture manner. The primary technology developed for such switching is adjustment of the index of refraction of thin-film silica waveguides by locally changing the temperature of the structure. Other possible solutions being investigated include free-space routing using microelectromechanical systems (MEMS) based micro-mirror arrays, and the use of inkjet technology to inject bubbles into channels within waveguides.

The present invention provides an optical switch in which an electrophoretic medium is in intimate contact with the core of a thin film waveguide having a core and a cladding. The electrophoretic medium comprises a suspending fluid and a plurality of electrically charged particles suspended in the suspending fluid and capable of moving therethrough upon application of an electric field to the capsule. The charged particles and the suspending fluid differ in refractive index; typically, the particles will have a higher refractive index than the suspending fluid, and the description of the invention below will normally assume that this is the case, although it will be apparent to those skilled in optics that the invention will function with particles having a lower refractive index than the suspending fluid. Neither the particles nor the suspending fluid need be colored in the normal sense of that term; the particles may be formed from a high refractive index pigment such as titania, which is white. The suspending fluid and the particles may or may not be encapsulated in a plurality of capsules.

In one embodiment of the present switch, in the "on" state, the particles are driven electrophoretically away from the waveguide core, so that the effective refractive index of the portion of the "cladding" occupied by the electrophoretic medium is that of the suspending fluid. Consequently, light passing along the core remains within the core and passes through the switch without significant attenuation. However, in the "off" state of the optical switch, the particles are driven electrophoretically into contact with the waveguide core, so that the effective refractive index of the portion of the "cladding" occupied by the electrophoretic medium is that of the "pack" of pigment particles, and this pack is closely enough to the core to couple optically therewith. Since the effective refractive index is now substantially higher, provided the refractive index of the pack is higher than that of the core, light passing along the core passes into the electrophoretic medium and does not pass through the switch. (It will be appreciated that if the suspending fluid has a higher refractive index than the particles, the on and off states of the switch will be reversed.)

In another embodiment of the present switch, the change in effective refractive index is not sufficient to cause light passing along the core to be diverted into the electrophoretic medium, but is sufficient to cause a phase shift in the light passing through the switch. The switch is placed in one arm of a Mach-Zender (or similar) interferometer, so that the phase shift effected by the switch modulates the output of the interferometer.

The present invention also provides an optical switch based upon dielectrophoretic movement of particles. In this embodiment, an electrophoretic medium comprising electrically charged particles and a suspending fluid is placed with an opening in a waveguide, this opening being provided with electrodes disposed so that if a direct current voltage is applied across the electrodes, the particles will move adjacent one face of the waveguide, which will therefore be occluded, with attenuation of the light passing along the waveguide. However, if an alternating current voltage of sufficient frequency is applied across the electrodes, the particles move towards the outer periphery of the opening, the region of highest field gradient, leaving the center of the opening free from particles (i.e., free from scattering centers) so that light passing along the waveguide passes freely through the opening with essentially no attenuation. The dielectric properties of the particles and suspending fluid (and any binder present) should of course be optimized to produce the desired behavior. It is presently preferred that the dielectric constant of any binder present be higher than that of the suspending fluid, and that the dielectric constant of the particles also be higher than that of the suspending fluid. Further guidance regarding choice of materials for use in dielectrophoretic displays may be found in the copending application Ser. No. 10/687,166, filed Oct. 16, 2003.

Figure 2:
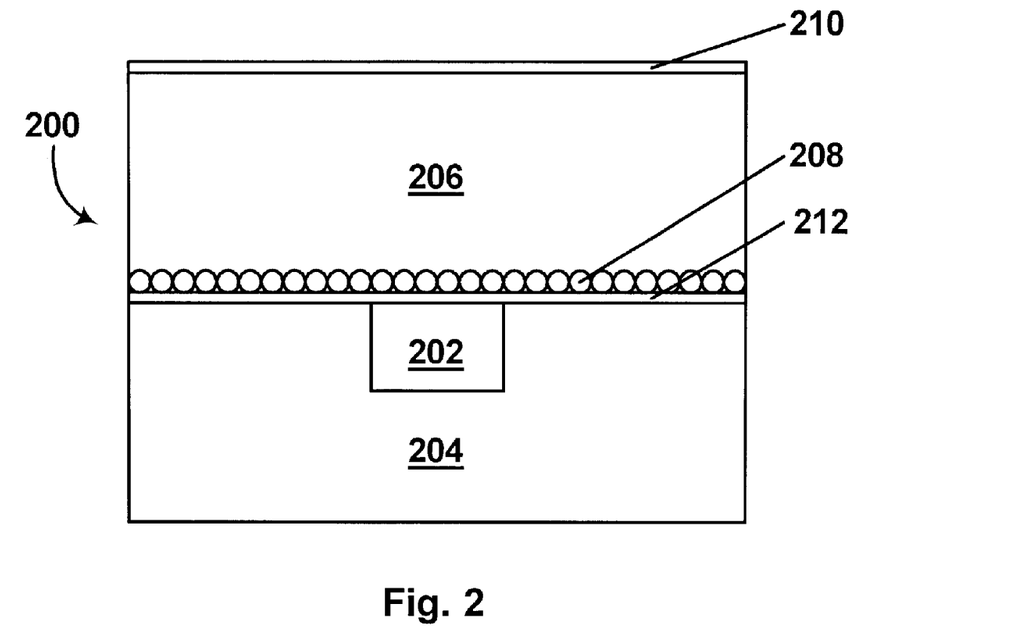
FIG. 2 is a schematic section through a first optical switch of the present invention.

FIG. 2 of the accompanying drawings shows an optical switch (generally designated 200) of the present invention disposed adjacent an optical waveguide comprising a core 202 and a cladding 204. Adjacent the waveguide is disposed an electrophoretic cell comprising a suspending fluid 206 having a plurality of particles 208 suspended therein, this cell being provided on opposed surfaces with electrodes 210 and 212, which are transparent and may be formed, for example, from indium tin oxide. These electrodes 210 and 212 are provided with a control circuit (not shown) to enable the voltage difference between the electrodes to be varied.

For the sake of illustration, it is assumed that the particles 208 are titania particles bearing a negative charge and having a higher refractive index than the suspending fluid 206, which will typically be a hydrocarbon. FIG. 2 shows the switch in its off position. To reach this off position, the electrode 212 adjacent the core 202 is made positive relative to the other electrode 210, so that the negatively charged particles 208 move adjacent the electrode 212, thus raising the effective refractive index of the medium adjacent the core 202 and causing light passing along this core to be diverted into the particles 208, so that the light is attenuated. When it is desired that light pass freely along the core 202, the electrode 212 is made negative relative to the other electrode 210, so that the negatively charged particles 208 move adjacent the electrode 210 and the effective refractive index of the medium adjacent the core 202 is the low refractive index of the suspending fluid 206. Under these conditions, light does not leave the core 202 but passes freely therethrough without any significant attenuation in the optical switch 200.

Figure 3:
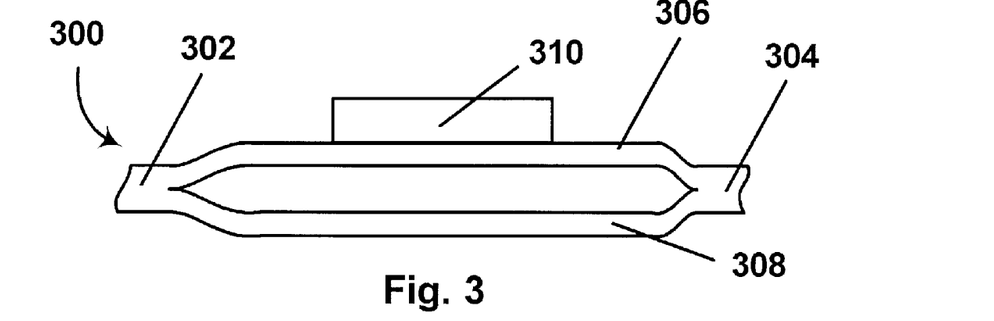
FIG. 3 illustrates schematically an optical switch of the present invention used in a Mach-Zender interferometer.

FIG. 3 of the accompanying drawings shows, in a highly schematic manner, an optical switch of the present invention being used to control light passing through a Mach-Zender interferometer (generally designated 300). This interferometer 300 has an input waveguide 302, an output waveguide 304, a modulating arm 306 and a reference arm 308. An optical switch 310, substantially similar in construction to that shown in FIG. 2, is provided in the modulating arm 306. As previously described, the optical switch 310 is arranged so that, in its off position, it causes a phase shift in light passing along the modulating arm 306, thereby modulating the intensity of the light in the output waveguide 304.

Figure 4:
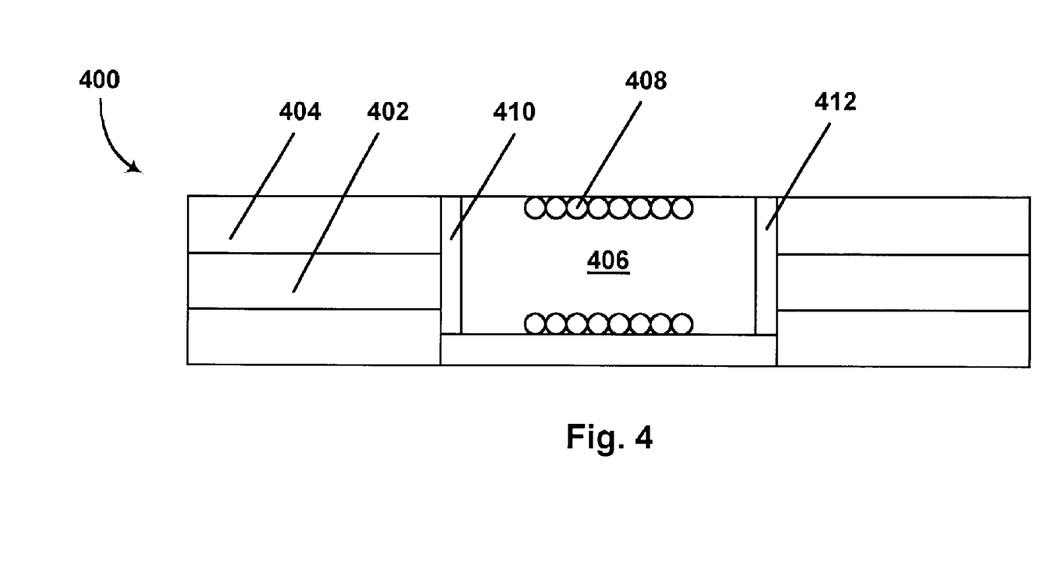
FIG. 4 is a schematic section through a second optical switch of the present invention, this optical switch making use of dielectrophoretic movement of particles.

FIG. 4 of the accompanying drawings is a schematic section through an optical switch (generally designated 400)

of the present invention which makes use of dielectrophoretic movement of particles. The switch is used in conjunction with a waveguide comprising a core 402 and a cladding 404. A recess is formed in the waveguide extending across the whole cross-section of the core 402 and this recess is filled with an electrophoretic medium comprising a transparent suspending fluid 406 and electrically charged particles 408. Transparent electrodes 410 and 412 are provided on the end walls of the recess, these electrodes 410 and 412 extending across the whole cross-section of the core 402.

FIG. 4 shows the switch in its on position, in which it does not attenuate light passing along the core 402. To reach this on position, a high frequency alternating voltage is applied across the electrodes 410 and 412, thus driving the particles 408 to the outside central portion of the recess, as illustrated in FIG. 4. In this position, light from the core on one side of the switch can pass through the electrodes 410 and 412 and the transparent suspending fluid 406 without striking the particles 408, and can thus reach the core on the other side of the switch without substantial attenuation. To set the switch to the off position, a direct current voltage is applied across the electrodes 410 and 412, thus driving the particles 408 adjacent one of the electrodes 410 and 412. In this position, the particles 408 prevent light from the core on one side of the switch passing through the recess and reaching the core on the other side of the switch.

From the foregoing description, it will be seen that the present invention provides an optical switch, based upon electrophoretic or dielectrophoretic motion of particles, which is simple and inexpensive to construct and which has the advantages of bistability (since once the switch has been placed in the desired state it will remain in this state for a substantial period even after the electrical field is removed) and low power consumption. Most other approaches to optical switches require continuous power to maintain the desired state, which results not only in increased energy consumption but leads to an undefined power-off state.

Section C: An Electrophoretic Display Using Lateral Motion of Particles

In another aspect, this invention provides an electrophoretic display using lateral motion of particles.

As discussed in the aforementioned E Ink and MIT patents and applications, most electrophoretic displays are opaque and operate in reflective mode. However, shutter mode electrophoretic displays are known; see for example the aforementioned U.S. Pat. No. 6,130,774. In such shutter mode displays, the capsules have a light-transmitting state, in which the electrophoretic particles are gathered into a minor part of the cross-section of each capsule, so that the major part of this cross-section transmits light. The capsules also have a light-blocking state, in which the electrophoretic particles are dispersed across a major part (and preferably the whole) of the cross-section of each capsule, so that the capsules block the passage of light therethrough. The movement of the electrophoretic particles between the minor and major parts of the cross-section may be effected by providing the capsule with two electrodes of unequal size or by forming a tapered capsule having wide and narrow ends; both arrangements are fully described in the aforementioned U.S. Pat. No. 6,130,774.

The present invention provides a shutter mode electrophoretic display in which the transition between the light-transmitting and light-blocking states is effected by movement of electrophoretic particles laterally relative to the viewing surface of the display. In the light-blocking state, the particles are dispersed across the whole area of a pixel of the display. However, in the light-transmitting state, the particles are moved adjacent an electrode so that the particles occupy only a small part of the area of a pixel, which thus becomes light-transmissive.

There are numerous possible variants of such a display. The electrophoretic particles may be encapsulated in a plurality of capsules or retained within a plurality of microcells. If the display comprises a plurality of capsules, these capsules could be located within apertures of a support structure, with the members of the support structure forming the electrodes. For example, the support structure could have the form of a series of channels in which the capsules are held, with the walls of the channels carrying spaced electrodes arranged to move the particles laterally relative the viewing surface.

Figure 5:
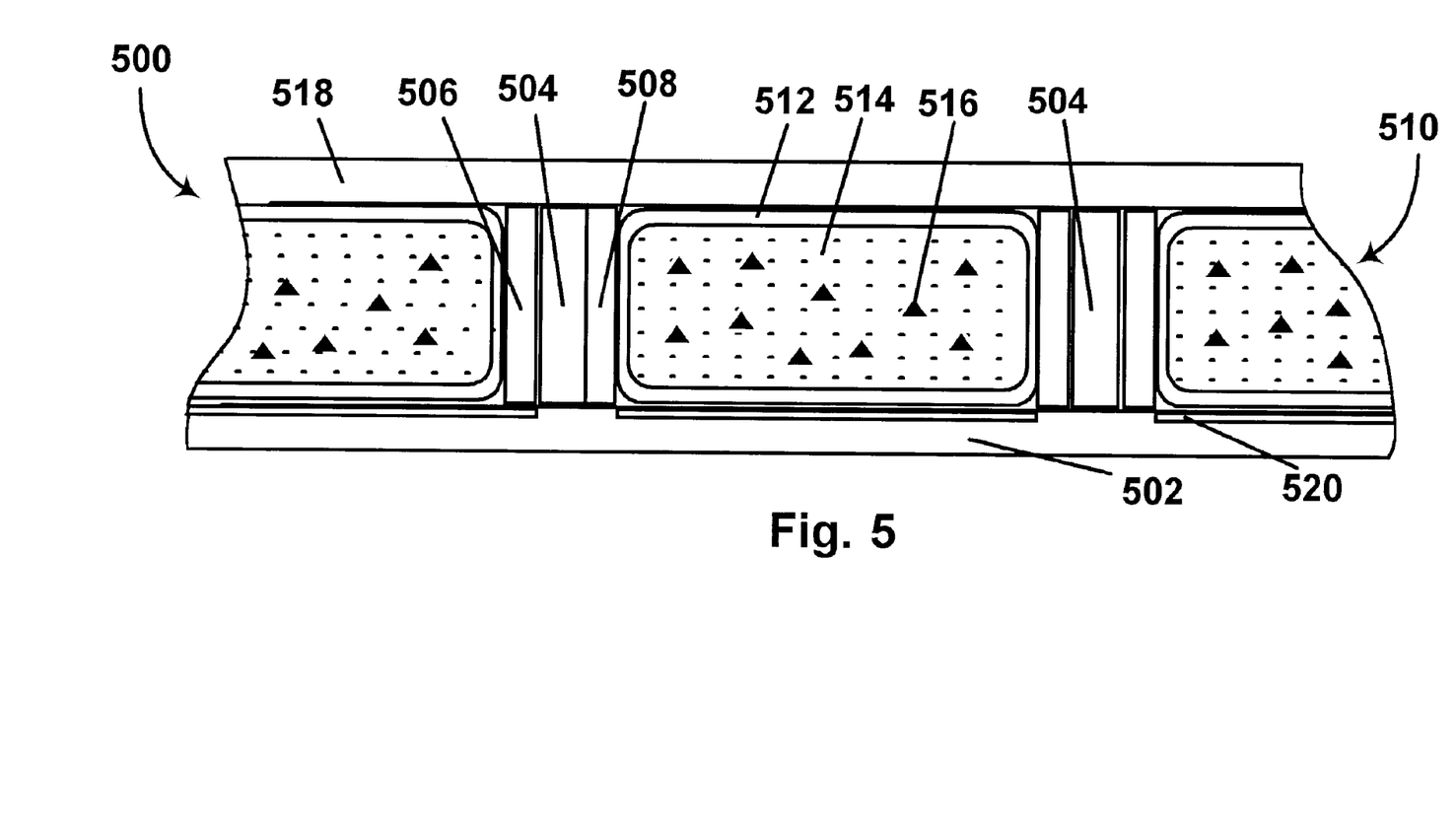
FIG. 5 is a schematic section through a second, shutter mode electrophoretic display of the present invention.

A display (generally designated 500) of this type is illustrated in FIG. 5 of the accompanying drawings. The display 500 comprises a support structure including a base plate (or rear substrate) 502 and a plurality of divider members (or side walls) 504, which extend upwardly (as illustrated in FIG. 5) from the base plate 502. The divider members carry electrodes 506 and 508 on their opposed vertical surfaces; the electrodes 506 are continuous along the vertical surface of each divider member 504, whereas the electrodes 508 are interrupted at regular intervals to form a plurality of discrete electrodes, each of which defines one pixel of the display. The electrodes 506 and 508 are connected to control circuitry (not shown) which enables the voltage applied to each electrode 508 to be varied independently relative to the facing electrode 506.

As shown in FIG. 5, the divider members 504 and the structures, formed by the divider members 504 together with the electrodes 506 and 508, define a plurality of parallel channels (cavities), and in these channels are accommodated a plurality of capsules (generally designated 510). Each capsule 510 comprises a capsule wall 512, a suspending fluid 514 and a plurality of a single type of electrically charged light absorbing particle 516 (conveniently formed of carbon black) suspended in the suspending fluid 514. A protective front layer (front substrate) 518, which forms the viewing surface through which an observer views the display, is provided to seal the capsules 510 within the channels, and a reflective coating 520 is provided on the portions of the base plate 502 lying adjacent the capsules 510.

The capsules 510 are shown in FIG. 5 in their light-blocking state, in which the particles 516 are dispersed throughout the suspending fluid 514, so that the relevant pixels of the display appear black. This light-blocking state may be achieved by applying a high frequency alternating voltage across the electrodes 506 and 508 to provide the necessary dispersion of the particles 516 throughout the suspending fluid 514. To achieve a light-transmissive state, a direct current voltage is applied across the electrodes 506 and 508 for a period sufficient to cause all the particles 516 to approach closely one of the electrodes 506 and 508, depending of course upon the polarity of the applied electric field and the charge on the particles. Thus, the major part of the area of the relevant pixel is now free from the particles 516, the reflective coating 520 is visible to the observer and the pixel appears white.

It may be convenient when rewriting the display 500 to first drive all the pixels black by applying the same alternating voltage across all the electrodes 506 and 508, and then to turn the desired pixels white by applying the direct current voltage.

From the foregoing description, it will be seen that the present invention provides shutter mode electrophoretic displays which are simple and inexpensive to construct.

Numerous changes and modifications can be made in the preferred embodiments of the present invention already described without departing from the spirit and skill of the invention. Accordingly, the foregoing description is to be construed in an illustrative and not in a limitative sense.

What is claimed is:

1. An electrophoretic display comprising:
   a light-transmissive front substrate;
   a rear substrate spaced from the front substrate so as to leave at least one sealed cavity therebetween; and
   an electrophoretic medium disposed in the at least one sealed cavity, the electrophoretic medium comprising a liquid and a plurality of capsules suspended in the liquid, each of the capsules comprising a capsule wall, a suspending fluid held within the capsule wall and at least one electrically charged particle suspended in the suspending fluid so as to be capable of moving therethrough on application of an electric field to the electrophoretic medium.

2. An electrophoretic display according to claim 1 wherein at least one of the front and rear substrates is provided with an electrode arranged to apply an electric field to the electrophoretic medium.

3. An electrophoretic display according to claim 2 wherein the front substrate is provided with a single electrode extending across the display, and the rear electrode is provided with a plurality of discrete electrodes.

4. An electrophoretic display according to claim 1 wherein the liquid has substantially the same composition as the suspending fluid.

5. An electrophoretic display according to claim 4 wherein the liquid and the suspending fluid both comprise a hydrocarbon solvent, or a mixture of a hydrocarbon solvent and a halocarbon.

6. An electrophoretic display according to claim 1 wherein the liquid has a greater viscosity than the suspending fluid.

7. An electrophoretic display according to claim 1 wherein the liquid is substantially iso-osmotic with the suspending fluid.

8. An electrophoretic display according to claim 1 wherein the liquid is essentially free from polymerizable species.

9. An electrophoretic display according to claim 1 wherein each of the capsules comprises at least one first type of electrically charged particle suspended in the suspending fluid and at least one second type of electrically charged particle suspended in the suspending fluid, the second type of particle having at least one optical characteristic differing from that of the first type of particle, the second type of particle also having an electrophoretic mobility differing from that of the first type of particle.

10. An electrophoretic display according to claim 9 wherein the first and second types of particles bear charges of opposite polarities.

11. An electrophoretic medium comprising a liquid and a plurality of capsules suspended in the liquid, each of the capsules comprising a capsule wall, a suspending fluid held within the capsule wall and at least one electrically charged particle suspended in the suspending fluid so as to be capable of moving therethrough on application of an electric field to the electrophoretic medium, the liquid being essentially free from polymerizable species.

12. An electrophoretic medium according to claim 11 wherein the liquid has substantially the same composition as the suspending fluid.

13. An electrophoretic medium according to claim 11 wherein the liquid has a greater viscosity than the suspending fluid.

14. An electrophoretic medium display according to claim 11 wherein the liquid is substantially iso-osmotic with the suspending fluid.

15. A process for forming an electrophoretic display, which process comprises:
    providing a front light-transmissive substrate and a rear substrate spaced from the front substrate so as to leave at least one cavity therebetween, at least one of the front and rear substrates having walls defining an aperture connecting the at least one cavity to the exterior surface of at least one of the front and rear substrates;
    providing an electrophoretic medium comprising a liquid and a plurality of capsules suspended in the liquid, each of the capsules comprising a capsule wall, a suspending fluid held within the capsule wall and at least one electrically charged particle suspended in the suspending fluid so as to be capable of moving therethrough on application of an electric field to the electrophoretic medium; and
    introducing the electrophoretic medium via the aperture into the at least one cavity.

16. A process according to claim 15 wherein, after the electrophoretic medium has been introduced into the at least one cavity, the aperture is sealed.

17. A process according to claim 15 wherein, prior to the introduction of the electrophoretic medium, the at least one cavity is substantially evacuated, and the introduction of the electrophoretic medium into the at least one cavity is effected by contacting the aperture with a quantity of the electrophoretic medium under a pressure greater than that in the substantially evacuated at least one cavity.

* * * * *